Patented Oct. 9, 1951

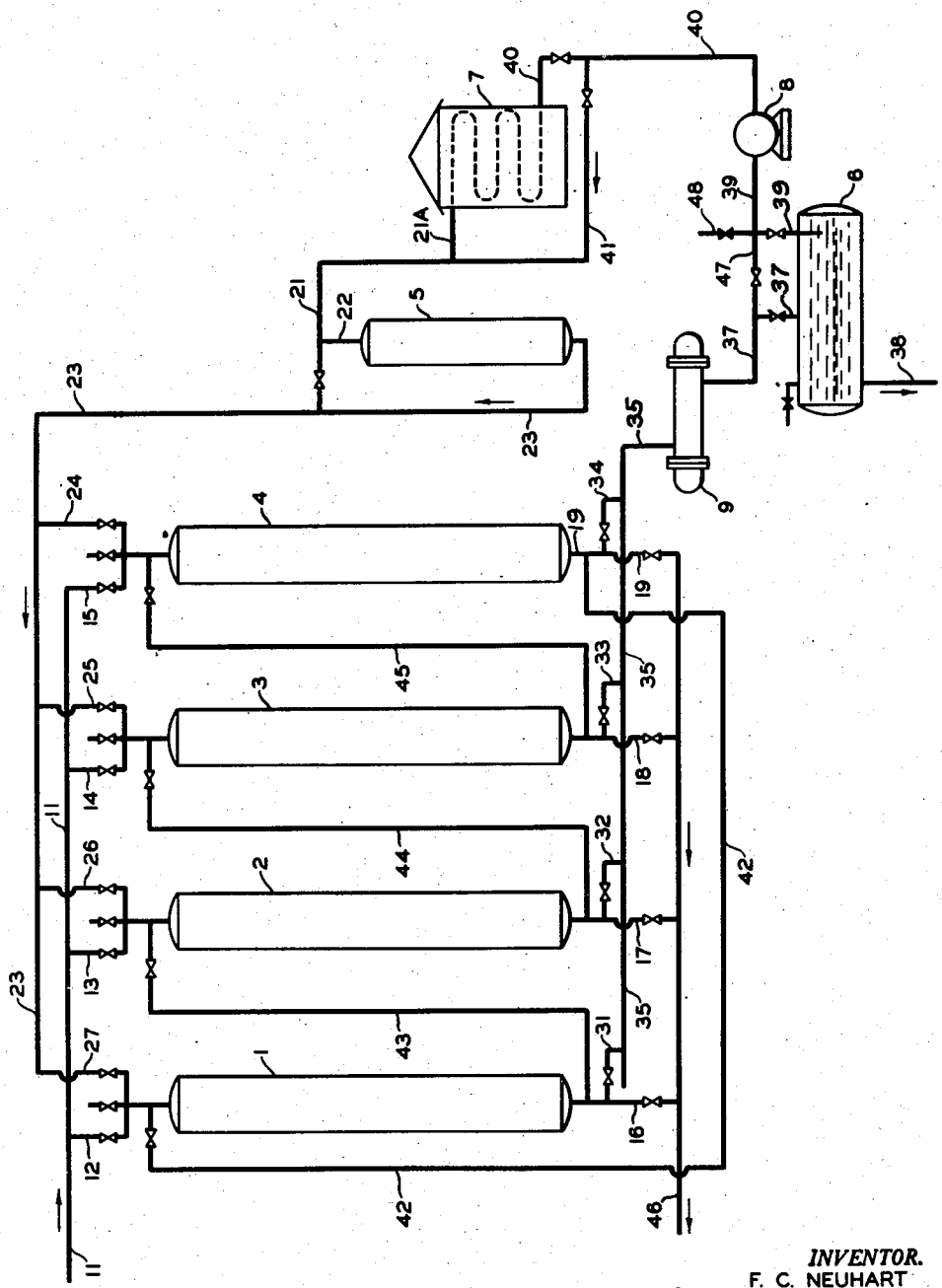

2,570,974

UNITED STATES PATENT OFFICE 2,570,974

DEHYDRATION OF PETROLEUM HYDROCARBONS

Frederick C. Neuhart, Bartlesville, Okla., assignor to Phillips Petroleum Company, a corporation of Delaware Application January 4, 1949, Serial No. 69,088

9 Claims. (Cl. 34—13)

1

This invention relates to the dehydration of fluids. In one of its more specific aspects it relates to a method for the regeneration of used or spent solid desiccants. In a still more specific aspect it relates to a method for cooling a solid desiccant material in which a moisture-free hot desiccant is cooled without the adsorption of moisture during the cooling step.

In the past, when solid desiccant material, such as bauxite or silica gel, is being cooled following the moisture removal or desorption step, the hot desiccant is frequently cooled by passage of a cool fluid through the desiccant. This cool fluid frequently contains moisture. As soon as the desiccant is cooled to a temperature below the equilibrium temperature above which desorption of moisture occurs and below which adsorption of moisture takes place, the desiccant will adsorb moisture from the cooling fluid. Under such conditions, upon further cooling of the desiccant, more moisture will be adsorbed and by the time the desiccant has been cooled to a sufficiently low temperature for use in the desiccating operation, the desiccant will be partly spent.

One object of this invention is to devise a method for cooling hot moisture-free desiccants so that the finally cooled desiccant will be free from moisture and in a fully regenerated condition. Another object of my invention is to devise a process which is adaptable for the use of a portion of the fluid being dried for the regeneration of the moisture containing desiccant and further that some of this fluid may be used in cooling the hot desiccant. Still other objects and advantages of my invention will be realized by those skilled in the art upon reading the following disclosure, which, taken with the accompanying drawing, forms a part of this specification.

The drawing is a diagrammatic representation of one form of apparatus in which to practice the process of my invention.

Referring now to the drawing, the apparatus consists of primary desiccators, 1, 2, 3 and 4, which are charged with a desiccant material, such as bauxite or silica gel, or other conventional solid desiccating material. Each of these desiccating tanks or vessels is equipped with several pipe connections for conducting fluids into or out of these vessels. An auxiliary vessel 5 is filled with a solid desiccant material. This desiccant material in vessel 5 may be the same material as used in the primary driers or it may be other desiccating materials, as desired. A heater 7 is intended to provide heat for heating

2 the fluid used for removal of the moisture from the spent desiccating material in tanks 1, 2, 3, 4 and 5. A condenser 9 is provided for cooling the moisture laden fluid coming from the several desiccating vessels. A tank 6 is essentially an accumulator vessel in which water condensed by condenser 9 may separate from the condensed and/or uncondensed cooling fluid. A pump or compressor 8 transfers the fluid separated from the water in vessel 6 through the heater 7 for cycling to the moisture removal and drying steps of the process.

In the operation of the main drying step, a fluid to be dried enters the system through a line 11 from a source, not shown. If vessel 4 is on regeneration, the fluid to be dried from line 11 is then passed through the line 12 into the top of vessel 1. After contacting the solid desiccant in vessel 1, the fluid at least partially dried then leaves this vessel at its bottom and is passed through line 43 into the top of vessel 2. Fluid from vessel 2 is in a similar manner passed through a line 44 into the top of vessel 3. Fully dried fluid then leaves vessel 3 through a line 18 into the manifold line 46 by which the dried fluid leaves the system.

After such a drying step has been in operation for sometime and after vessel 1 has acquired a considerable amount of moisture, any moisture then not removed in vessel 1 will be removed in vessel 2. Likewise, the effluent from vessel 2, after this vessel has been on-stream for a relatively long period of time, is passed through vessel 3. When vessel 1 becomes fully charged with moisture, it will be closed off from line 11 by a valve in line 12 and a valve in line 43 will also be closed. The fluid being dried will then flow from line 11 through a line 13 into the top of vessel 2 and then vessels 2, 3 and 4 will be ready for the drying operation and fully dried fluid from vessel 4 will leave through line 19 and line 46 for removal from the system. When vessels 2, 3 and 4 are on the dehydrating cycle, vessel 1 will be placed on its regeneration cycle. Likewise, when vessel 2 becomes fully charged with moisture, it will be closed from line 11 and fluid to be dried will flow through line 14 into vessel 3 and vessels 3, 4 and 1 will then be on the dehydration cycle. Line 15 connects line 11 with the top of vessel 4 for passage of fluid to be dehydrated directly into this vessel. Lines 16 and 17 connect the bottom of vessels 1 and 2 with the manifold line 46. Line 45 is provided for passage of fluid from the bottom of vessel 3 into the top of vessel 4 and line 42 is provided for passage of fluid from the bottom of vessel 4 into the top of vessel 1.

When vessels 1, 2 and 3 are on the dehydrating cycle, vessel 4 as mentioned hereinbefore, will be on the regeneration cycle. To regenerate vessel 4, or in other words, to remove the moisture from the desiccating material in this vessel, a fluid is pumped by pump 8 through line 40 into heater 7 in which the fluid is heated to such a temperature that it will remove moisture from the desiccating material. This heated fluid leaves the heater through lines 21A and 21 and is passed through a line 22 into the top of the auxiliary desiccator vessel 5. Any moisture held by the desiccant in vessel 5 will be desorbed by the hot fluid flowing through this vessel. Moisture containing fluid from vessel 5 then flows through line 23 and line 24 into the top of the primary drying vessel 4. Upon continued passage of fluid from the heater through vessel 5 and vessel 4, the desiccating materials in both vessels become heated and give up their moisture. The moisture laden fluid leaves the bottom of vessel 4 through lines 19 and 34 and is then passed through line 35 to the condenser 9 in which the fluid is cooled to a temperature at which water separates. This cooling causes condensation of moisture and the cooled fluid flows on through a line 37 into separator 6. When cooled fluid passes through line 37 into vessel 6 the valve in line 47 is closed and the valve in line 39 is opened. Accumulated water in separator 6 may be withdrawn through a line 38 for such disposal as desired. Fluid is transferred by pump 8 from the vessel 6 through lines 39 and 40 to the heater 7 for completion of this portion of the regenerating cycle.

When the condenser 9 fails to cause further moisture separation from the fluid passing through it, the desiccants in vessels 4 and 5 are considered to be in a substantially moisture-free condition and the desiccant in vessel 4 is then ready to be cooled. The cooling operation is carried out by passing fluid from separator 6 through lines 39, 40 and 41. This fluid, as is seen from the drawing, by-passes the heater 7 which at this time may be permitted to "idle." The fluid then removed from separator 6 will be substantially at condenser temperature and this relatively cool fluid passes on from line 41 through lines 21 and 22 into the auxiliary desiccator 5. This auxiliary desiccator 5 is intended to remove moisture from the cooling fluid prior to its introduction into the main desiccator 4 so that moisture will not be carried into the desiccator 4 during the time it is on the cooling step of the cycle. The desiccating material in vessel 5 will, of course, be hot from its previous regeneration, and cool fluid is passed through this vessel until the desiccant therein becomes cool and the fluid issuing from this vessel will then be cool and dry. This fluid, at first hot, but becoming cool is passed on through lines 23 and 24 into vessel 4. Upon continued operation, the fluid flowing through lines 23 and 24 will rapidly cool the desiccating material in vessel 4. (However, the effluent fluid from vessel 5 may be at a somewhat higher temperature than the incoming fluid to vessel 5 on account of the heat of adsorption of the moisture contained in the cooling fluid passed into vessel 5. Nevertheless, the fluid issuing from vessel 5 will be relatively cool and upon passage through lines 23 and 24 into vessel 4, this latter vessel will be cooled to a predetermined adsorption temperature and will be free from moisture.)

During this cooling step, if desired, a pipe 47 which connects lines 37 and 39, as shown, may be used. This pipe may be used for by-passing the separator vessel 6 when no moisture is being condensed or separated in condenser 9. When by-passing the separator vessel 6 the valve in line 37 and the valve in line 39 are closed and the valve in line 47 is open, the fluid used for the cooling operation will then contain substantially no moisture since it has been previously removed and further no moisture is acquired from the water in accumulator 6. In this manner, the amount of moisture to be removed from the cooling fluid by the auxiliary dehydrator 5 will be a minimum. When using the pipe 47 to by-pass the water separator 6 and only a relatively small amount of moisture is adsorbed in the desiccant in vessel 5, this desiccant need not be regenerated during the regeneration of each of the primary adsorbers, but may be regenerated each time adsorber No. 1 is regenerated, for example. Under these conditions the auxiliary adsorber may need be somewhat larger in size and contain a larger quantity of adsorbent than when it is desorbed during the desorption of each of the primary adsorbers.

After the primary desiccator 4 has been cooled to a desired temperature, the regenerating apparatus may stand by, or if, for example, desiccating vessel 1 is ready for regeneration the fluid pumped by pump 8 may then flow through pipe 40 into heater 7 and thence through lines 21A, 21 and 22, desiccator vessel 5 and on through line 23, and through line 27 which delivers the hot fluid into the top of vessel 1. Moisture laden fluid then leaves vessel 1 through line 16 and this fluid is further conducted through lines 31 and 35 to condenser 9. When water begins to separate from fluid in condenser 9, the valve in line 47 should be closed so that condensate may be delivered into vessel 6 for separation of the water. The regeneration of the vessel 1 and the cooling of the desiccant when free from moisture may be carried out in the manner as described for vessel 4. Likewise, the regeneration and cooling of vessels 2 and 3 will also be like the steps described for the regeneration of vessel 4. The regeneration of vessels 2 and 3 are carried out by passing the heated and cooling fluids through pipes 26 and 25, respectively, into these vessels, and through pipes 32 and 33, respectively, out of these vessels, in the same manner as above described.

This drying system may be used for drying such fluids, as for example, butane, propane, pentane, isobutane, the butenes, or most any other liquid or gas. When such a fluid as butane, or isobutane, are being dried in the desiccators 1, 2, 3 and 4, some of this same fluid may be used for the regeneration and cooling cycles. However, when drying such a fluid as butadiene or unsaturated hydrocarbons which polymerize at temperatures used in regeneration of the desiccant, it is preferable to use other gas for the regeneration and cooling cycles such as, for example, butane, isobutane, nitrogen, hydrogen, or carbon monoxide. Such other fluid may be introduced into the system through a line 48, from a source, not shown.

The primary desiccators may be used for dehydrating a liquid material as well as a gas, and the desiccant regeneration and cooling operation of my invention may be carried out by circulation of a gas and/or a liquid, or broadly, a fluid. If the regeneration and cooling are carried out by passing a liquid through the desiccant, water must be sufficiently soluble in this liquid at the desorbing temperature that the water can be absorbed by the liquid and removed from the body of desiccant. The liquid must also possess a proper temperature coefficient of solubility of water so that upon cooling the water will separate as a separate and distinct phase. The desiccant regenerating and cooling fluid may also be a gas, a vapor, or a vapor-liquid mixture. Normal or isobutane are examples of fluids suitable for use in the gaseous or vaporous state or as a vapor-liquid mixture. Diethyl ether is an example of a liquid which may be used as the regenerating and cooling fluid in the liquid state. When using such a liquid as diethyl ether as a regenerating and cooling liquid sufficient pressure should be maintained on the system to keep the ether in the liquid state.

Materials of construction of this apparatus may be selected from among those commerically available since special problems do not ordinarily exist unless the fluid being treated or the fluids use in regeneration are corrosive. Many recording devices, flow meters and the like, are not shown or described for purposes of simplicity. The installation and use of such auxiliary equipment is well known in the art. It will be obvious to those skilled in the art that many variations of the process hereinabove described may be practiced without departing from the intended spirit and scope of my invention.

Having described my invention, I claim:

1. A method for regenerating a moisture laden solid desiccant comprising heating a fluid to a moisture desorbing temperature, said fluid being nonpolymerizable in the presence of said solid desiccant at said moisture desorbing temperature, passing said heated fluid through a body of said moisture laden solid desiccant, cooling moisture laden hot fluid from said body of desiccant to a temperature at which water separates as a separate phase, separating water from said cooled fluid, heating said last stated cooled fluid to said moisture desorbing temperature and continuing this operational cycle until said moisture laden desiccant is free of moisture then further passing separated cooled fluid from the water separation step through a body of active solid desiccant, and further passing the fluid from said active solid desiccant through the first mentioned body of solid desiccant until this last mentioned desiccant has acquired a desired moisture adsorbing temperature.

2. The method of claim 1 wherein said fluid is a gas.

3. The method of claim 1 wherein said fluid is a liquid having a high temperature coefficient for the solubility of water.

4. The method of claim 1 wherein said fluid is a condensible vapor.

5. The method of claim 1 wherein said fluid is a mixture of vapor and liquid.

6. The method of claim 1 wherein said solid desiccant is bauxite.

7. A method for regenerating a moisture laden solid desiccant comprising heating a gas to a moisture desorbing temperature, said gas being nonpolymerizable in the presence of said solid desiccant at said moisture desorbing temperature, passing said heated gas through an auxiliary body of moisture containing solid desiccant, passing moisture containing heated gas from said auxiliary body of desiccant through a body of moisture laden solid desiccant to be regenerated, cooling gaseous effluent from this latter desiccant to a temperature below its water vapor dew point, separating condensed water from said cooled effluent, heating the uncondensed gas as said regenerating gas to said moisture desorbing temperature and continuing this operational cycle of steps until said moisture laden desiccant is free from moisture then cooling the auxiliary body of desiccant and the body of desiccant to be regenrated by passing separated cooled gas from the water separation step through said auxiliary body of desiccant, and passing gaseous effluent from said auxiliary body of desiccant through said body of desiccant to be regenerated until said latter body of desiccant reaches a desired temperature.

8. The method of claim 7 wherein the desiccant is bauxite.

9. A method for regenerating a moisture laden solid desiccant comprising heating a fluid to a moisture desorbing temperature, said fluid being nonpolymerizable in the presence of said solid desiccant at said moisture desorbing temperature, passing said heated fluid through an auxiliary body of moisture containing solid desiccant, passing moisture containing heated fluid from said auxiliary body of desiccant through a body of moisture laden solid desiccant to be regenerated, cooling fluid effluent from this latter desiccant to a temperature at which water separates as a separate phase, separating water from said cooled fluid, heating said last stated cooled fluid to said moisture desorbing temperature and continuing this operational cycle of steps until said moisture containing bodies of desiccant are free from moisture, cooling the auxiliary body of desiccant by passing separated cooled fluid from the water separation step through said auxiliary body of desiccant and cooling the body of desiccant to be regenerated by passing fluid effluent from said auxiliary body of desiccant through said body of desiccant to be regenerated until said latter body of desiccant reaches a desired temperature.

FREDERICK C. NEUHART.

REFERENCES CITED

The following references are of record in the file of this patent:

UNITED STATES PATENTS

| Number | Name | Date |
| --- | --- | --- |
| 1,420,613 | Voress et al. | June 20, 1922 |
| 1,721,033 | Okochi | July 16, 1929 |
| 2,323,524 | Downs, Jr. | July 6, 1943 |
| 2,359,660 | Martin et al. | Oct. 3, 1944 |
| 2,459,463 | Simpson | Jan. 18, 1949 |